United States Patent
Barfield et al.

(10) Patent No.: US 8,201,261 B2
(45) Date of Patent: Jun. 12, 2012

(54) SECURE DATA STORAGE SYSTEM AND METHOD

(76) Inventors: Chase Barfield, Bolivar, MO (US); Jason Cornell, Bolivar, MO (US); Jeff Arbour, Toronto (CA)

(*) Notice: Subject to any disclaimer, the term of this patent is extended or adjusted under 35 U.S.C. 154(b) by 321 days.

(21) Appl. No.: 12/430,643

(22) Filed: Apr. 27, 2009

(65) Prior Publication Data

US 2010/0275005 A1    Oct. 28, 2010

(51) Int. Cl.
  *G06F 7/04* (2006.01)
  *G06F 17/30* (2006.01)
  *H04N 7/16* (2011.01)

(52) U.S. Cl. .......... 726/26; 380/247; 380/248; 380/249; 380/250; 380/277; 705/18; 705/57; 705/58

(58) Field of Classification Search ...................... 705/26
  See application file for complete search history.

(56) References Cited

U.S. PATENT DOCUMENTS

| | | | | |
|---|---|---|---|---|
| 7,865,172 B2* | 1/2011 | Blair et al. | ..................... | 455/411 |
| 2006/0165060 A1* | 7/2006 | Dua | ............... | 370/352 |
| 2008/0080717 A1* | 4/2008 | Anzai | ............ | 380/279 |
| 2008/0181406 A1* | 7/2008 | Iyer et al. | ...................... | 380/277 |
| 2008/0184035 A1* | 7/2008 | Iyer et al. | ...................... | 713/183 |

FOREIGN PATENT DOCUMENTS

JP    2004151886 A  *  5/2004

OTHER PUBLICATIONS

Nokia Intellisync Device Management. Nokia for Business, 2007. Available from <http://nds1.nokia.com/NOKIA_BUSINESS_26/Europe/Products/Mobile_Software/sidebars/pdfs/DeviceMgt_Datasheet_EMEA.pdf>.*
Lost Blackberry or forget your password. Forum posting on http://forums.pinstack.com/. Oct. 23, 2005. Available at <http://forums.pinstack.com/f8/lost_blackberry_or_forget_your_password-335/>.*
BlackBerry Enterprise Server for Microsoft Exchange, Version 4.0, Handheld Management Guide. Aug. 18, 2006. Available from <http://docs.blackberry.com/en/admin/deliverables/1655/Handheld_Management_Guide.pdf>.*
Nokia E50 Hands-on Preview. Blandford, Rafe. May 29, 2006. Available from <http://www.allaboutsymbian.com/features/item/Nokia_E50_Hands_on_Preview.php>.*

* cited by examiner

*Primary Examiner* — James A Reagan
(74) *Attorney, Agent, or Firm* — Lathrop & Gage LLP

(57) ABSTRACT

A system and method for the secure storage of data in a network. Data stored on a primary server connected to the network is initially encrypted. The IP address of the primary server is sent to a second server, via the network, and a communication is received from the second server indicating pending instructions. If the instructions indicate that theft of the primary server has occurred, then the data stored on the primary server is re-encrypted and the IP address of the primary server is sent to the second server. If attempted unauthorized access of the primary server is determined, and a predetermined number of consecutive unauthorized attempts to access the primary server are made, then the data stored on the primary server is erased.

10 Claims, 6 Drawing Sheets

SECURE DATA STORAGE SYSTEM AND METHOD

BACKGROUND

Previously, network data storage devices merely stored files that are accessible to the network. In most cases these storage devices have little or no electronic security beyond the network to which they are connected, and physical security no better than where the devices are located. Most network storage devices offer basic file password protection and some offer basic encryption schemes, but they typically do not offer any data defense to physical theft or have safeguards against electronic security attacks. The electronic security is generally handled at the network level (typically using only a firewall), which does not take into account the possibility of an attack from within the network.

SUMMARY

The present network security and storage server (NSSS) takes a proactive approach to data security. When a rogue attempt to electronically access data on the network is detected, the NSSS device has the ability to lock data down more securely and even destroy the data when appropriate. The present system provides the ability to physically track the device if it is stolen. All data transfer and communication with the NSSS, even though on a local network, is encrypted and all data drives are encrypted as well.

Each NSSS has an integrated hardware firewall, so that all security for the network and data is controlled by the NSSS. Data from an individual NSSS can be replicated in real-time with another NSSS on the local network and can also be replicated over the Internet to a secure location.

In an exemplary embodiment, data stored on a primary server connected to the network is initially encrypted. The IP address of the primary server is sent to a second server, via the network, and a communication is received from the second server indicating pending instructions. If the instructions indicate that theft of the primary server has occurred, then the data stored on the primary server is re-encrypted and the IP address of the primary server is sent to the second server. if attempted unauthorized access of the primary server is determined, and a predetermined number of consecutive unauthorized attempts to access the primary server are made, then the data stored on the primary server is erased.

DETAILED DESCRIPTION

The present data storage system provides a user with high-security data storage via a network including a pair of network security and storage servers (NSSS). The system design provides multiple redundancy and theft protection.

Figure 1A:
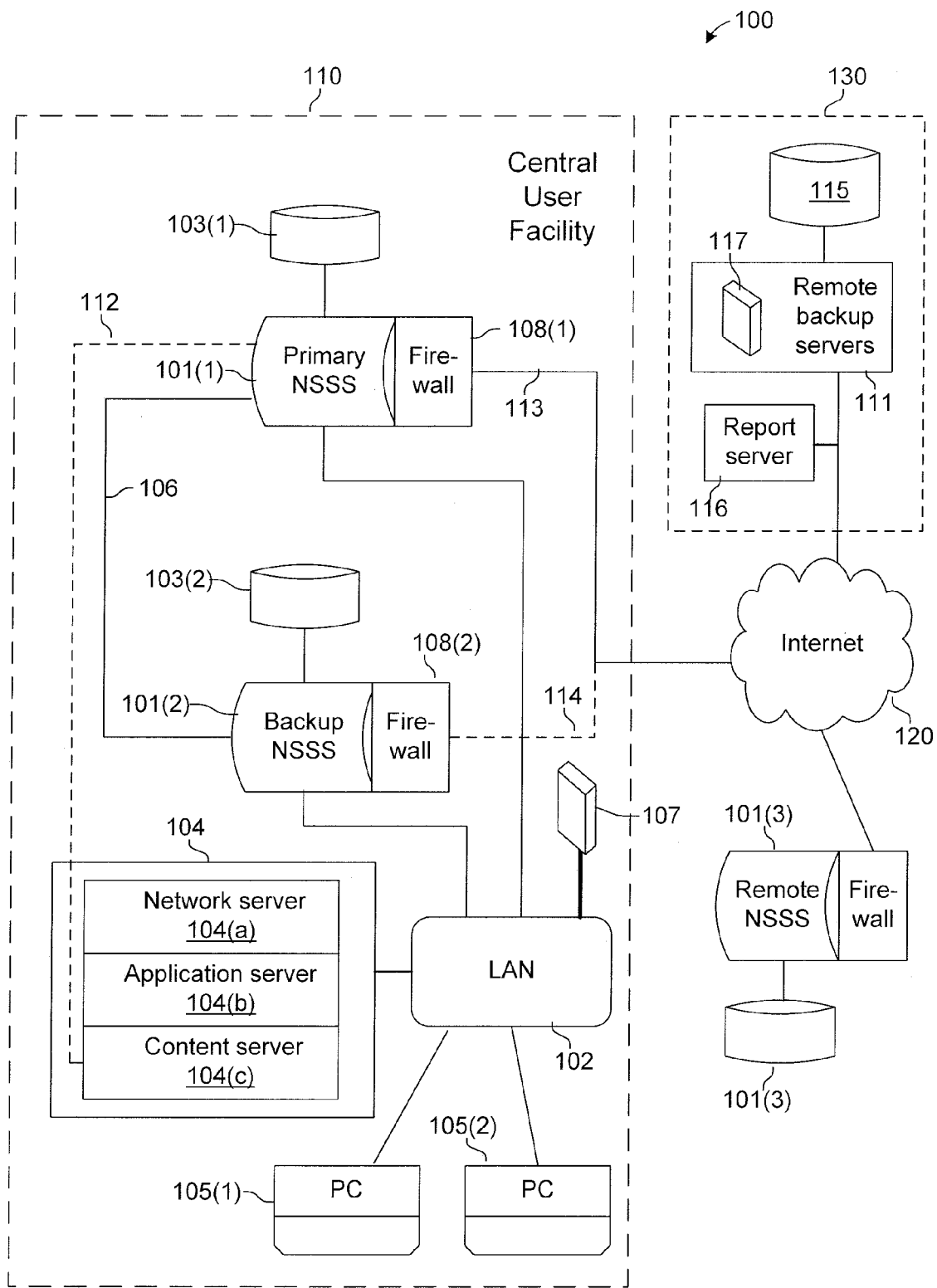
FIG. 1A is an exemplary high-level diagram illustrating certain components of the present system.

FIG. 1A is an exemplary high-level diagram illustrating certain components of the present system 100. As shown in FIG. 1A, the present system includes a primary network security and storage server 101(1) and a backup network security and storage server 101(2) interconnected via a dedicated gigabit Ethernet link 106. The network security and storage server 101 is hereinafter referred to as 'NSSS 101'. Subsequent references to 'NSSS 101' apply to the primary NSSS 101(1), the backup NSSS 101(2), or the backup NSSS 101(3) unless the context indicates otherwise.

Each NSSS 101 is connected via a local area network (LAN) to a LAN switch 102 to which a plurality of personal computers ('PC's) or other computers 105 and a server bank 104 are also connected. The LAN may be interconnected via Ethernet links, for example. The primary NSSS 101(1) is also connected to a wide area network (WAN), typically the Internet, via firewall 108(1) and cable 113. Although not normally connected to the WAN, the backup NSSS 101(2) is connected to the WAN via firewall 108(2) and cable 114 when functioning as the primary NSSS after a failover operation. A remote NSSS 101(3) may be located outside the central user facility 110 and connected to the present system 100 remotely via firewall 108(3) and the Internet 120 or other WAN.

Figure 1B:
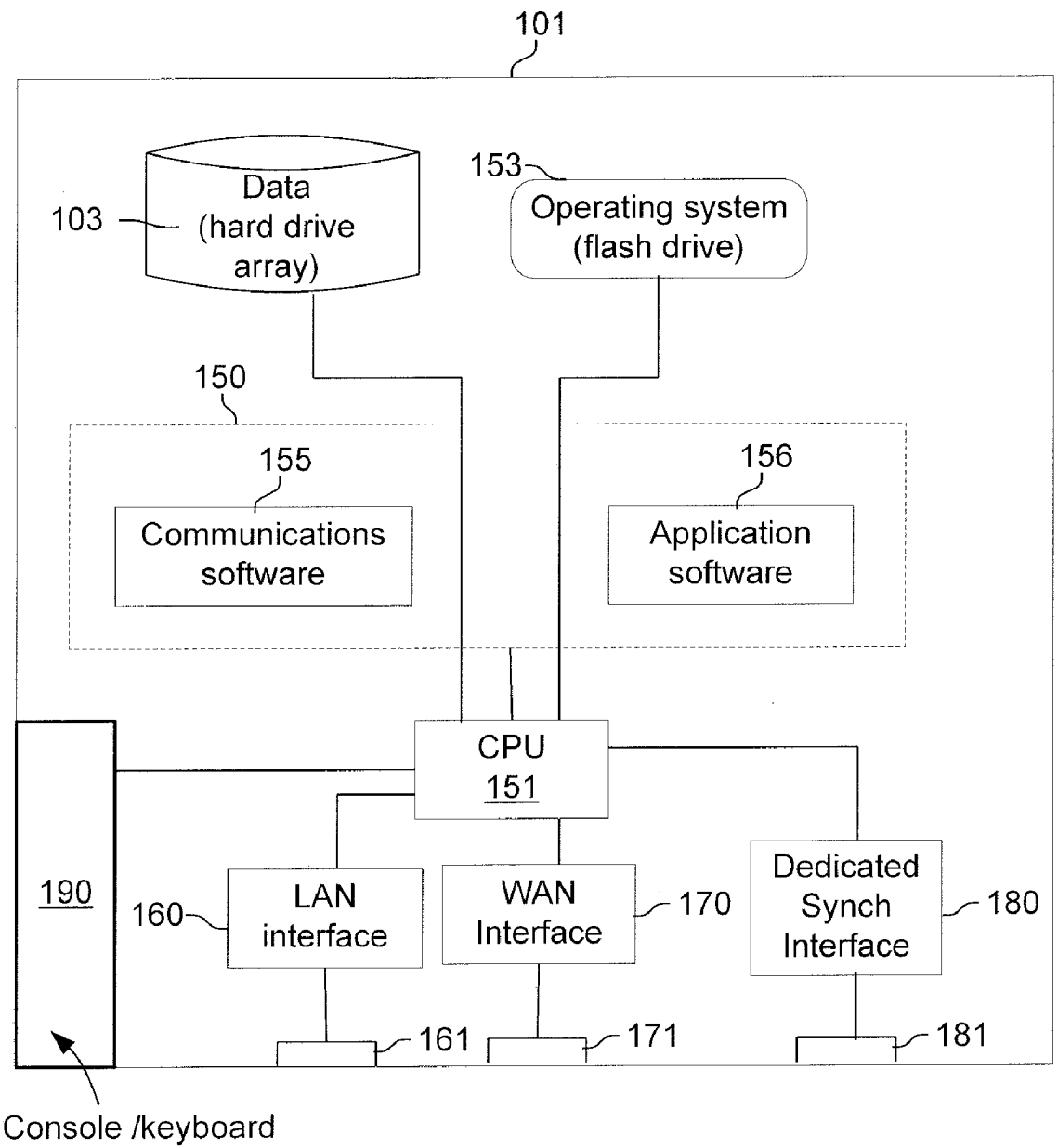
FIG. 1B is an exemplary high-level diagram illustrating certain components of a NSSS.

Each NSSS 101 includes a local data storage device 103, which is considered to be an integral part of the NSSS from a functional standpoint (as shown in FIG. 1B), although the storage device 103 is shown in FIG. 1A as a separate entity for the purpose of the present description. The primary NSSS 101(1) utilizes a firewall 108(1) to isolate the entire network from data received via the Internet or other external data source. The backup NSSS 101(2) has an integrated firewall 108(2) which is used if the primary NSSS fails over to the backup NSSS. Each NSSS 101 typically includes a rack mounted server case with secured removable data storage device 103 (hereinafter more simply referred to as hard drive 103), a LAN Ethernet connector, a WAN Ethernet connector and a dedicated Ethernet connection for synchronizing data with the backup NSSS. A single-user configuration interface manages the data storage and the firewall through a secure web interface accessible through the LAN connection only. The backup NSSS 101(2) is employed to manage data backup using remote backup servers 111.

In an exemplary embodiment, server bank 104 controls local network communications and applications, and includes network, application, and content servers 104(a), 104(b), 104(c), respectively. In an exemplary embodiment, a 'nano-PC' functions as a system 'security key' device 107, which is used in conjunction with system monitoring and triggering mechanisms described in detail below. In one embodiment, this nano-PC is a Pico-Tux Linux-based computer with power-over-Ethernet, manufactured by Kleinhenz Elektronik GmbH. The security key 107 is essentially a tiny PC that can be located (or concealed) practically anywhere in a user facility 110, requiring only that it be connected with to the LAN switch 102 via an Ethernet cable or wireless bridge. All system components 101-108 are also located inside the user facility 110.

Network server 104(a) functions as a controller for the internal (LAN) network (i.e., the network interconnected via LAN switch 102), allowing access to applications, network resources and content. In a typical scenario, servers 104(*) act as a bridge and service/application provider to the LAN, and do not hold any valuable data. All user data, including databases, documents, and individual server and PC backups, is initially stored on the local hard drive 103(1) coupled to the primary NSSS 101(1), and a copy of the user data is stored on the backup NSSS' hard drive 103(2), as well as on one or more hard drives 115 connected to the remote backup server bank 111.

User PCs 105 allow users to access applications from application server 104(b), which delivers the applications to the users. Users typically do not have direct access to an NSSS 101 for security purposes. Initially, only the content server 104(c) is granted access to the storage system, which includes NSSS devices 101 plus associated hard drives 103 and acts as a bridge for the rest of the network to access the data stored thereon.

If further connectivity is required, access can be scaled to allow multiple servers or PCs access to data storage. Although the present system 100 may include multiple network, application, and content servers 104(a), 104(b), and 104(c), it is preferable to keep only one single 'point of entry' to system data. The present system includes a 'storage network' which essentially includes the NSSS devices 101 and remote backup servers 111. Normally, a LAN connection on the primary NSSS 101(1) provides the only access to the network data. Data on the secondary (backup) NSSS 101(2) is only made available if the primary unit 101(1) fails, and data on the backup servers 111 is made available if both NSSS 101(1) and 101(2) fail.

In an exemplary basic installation, the primary NSSS 101 is connected to the LAN, and servers 104(a), 104(b), 104(c) access the NSSS in the configuration shown in FIG. 1A. In certain scenarios it may be beneficial to have a direct connection to one of the servers. In this case, the primary NSSS 101(1) is connected directly both to a server 104(c) (as indicated by the dashed line 112 in FIG. 1A) and also connected to the LAN on a separate network port, as in the basic configuration.

In an exemplary embodiment, certain data contained in database application will remain on its respective server **104(*) and is backed up on the primary NSSS 101(1). This backup data and all user data is stored on hard drives 103 and also backed up at remote server site 130. The data is encrypted using 256 bit AES encryption. In the present embodiment, the drive system 103 for each NSSS is RAID-based (redundant array of inexpensive disks) with 1, 0, 5, or 1+0 configuration options allowing for maximum server uptime. In an exemplary embodiment, the RAID system can be mirrored, i.e., the configuration may contain at least two hard drives that are duplicated in real-time. Data drives 103** can be configured in multiple ways—as a single drive or using multiple storage devices, either with or without some type of RAID array. The default configuration includes at least 2 drives set up in a mirrored array. Additional drives may be added to increase the system storage capacity.

FIG. 1B is an exemplary high-level diagram illustrating certain components of an NSSS 101. As shown in FIG. 1B, NSSS 101 comprises an x86 CPU-based circuit board to which is connected RAM memory 150, a hard drive array (typically 2-10 individual drives) 103 containing user data, a flash drive 153 including the operating system typically Linux-based), a LAN interface 160, a WAN interface 170, a dedicated interface 180 to synchronize with another NSSS, and a console/keyboard 190. LAN interface 160 is coupled to physical port 161, WAN interface 170 is coupled to physical port 171, and sync interface 180 is coupled to physical port 181. An NSSS 101 is not necessarily a traditional 'server', but can be configured from any suitably fast processor with sufficient local memory 150 (which may subsume drive array 103) and hardware support for ports 161/171/181.

LAN interface 160 is typically an Ethernet port, and WAN interface 170 is typically a high-bandwidth Ethernet port, and may include a Bluetooth, WIFI, or high speed modem module or the like, for various forms of Internet connectivity. RAM memory 150 is used to store programs including communications software 155 and application software 150 during operation. Communications software 155 includes software programs for communication with another NSSS 101, remote backup servers 111, and a report server 116, preferably remotely located (i.e., located outside of the central user facility 110). Report server 116 may be any suitable type of computer system (with an associated data storage device) connected to network 120. Application software 150 includes software for implementing the present method as described, and includes encryption and decryption routines for securing and reading data on drive 103, as well as data sent to/from other system servers and hard drives.

The primary NSSS 101(1) also acts as the internet gateway (embedded firewall) for the entire network, via link 113, and provides a full enterprise firewall 108(1) to the Internet 120. NSSS 101(1) also maintains a VPN (virtual private network) using an IPSEC encrypted tunnel to the remote backup server 111, the report server 116 and the optional remote NSSS 101(3). User data is synchronized between primary and backup NSSSs 101(1)/101(2) via the high-bandwidth link 106 between the two NSSSs. The backup NSSS 101(2) maintains an exact copy of the data from the primary NSSS 101. The primary NSSS 101(1) also automatically backs up its configuration to the backup NSSS 101(2) periodically to maintain firewall and other configuration information.

The backup NSSS 101(2) is capable of taking over the role of primary NSSS 101(1) when a fail-over condition is detected. If data on the primary NSSS 101(1) becomes unavailable, the primary NSSS 101(1) can be removed from the network and the configuration backup from the primary NSSS 101(1) that is stored on the backup NSSS 101(2) is then restored to the backup NSSS 101(2), thus turning it in to the primary (and only) NSSS 101. Once the original primary NSSS is repaired and the data brought back online, backup data from the backup NSSS 101(2) is transferred to it and it then becomes the backup NSSS 101(2). During the downtime, special instructions are written to the sole NSSS 101 to pause any attempt to synchronize data with the (nonexistent) backup NSSS 101(2) and to pause synchronization with the user's virtual server in the server bank 111 at remote server site 130.

When both primary and backup NSSS devices 101(1)/(2) are again operational, normal operation is resumed, with data from the backup NSSS 101(2) and the configuration for both NSSS devices 101(1)/(2) synchronized periodically with the servers in remote server bank 111. In an exemplary embodiment, the remote servers in bank 111 are VMware based virtual servers, and constitute another exact copy of the client's data. These remote servers contain a backup of both the primary NSSS 101(1) and backup NSSS 101(2) operating system 153. In the event that a user's data on both primary and backup hard drives 103 becomes unavailable, secure access to remote backup servers 111 can be enabled and access granted to the specific user's data contained within the backup drive system 115.

Once the NSSS devices at the user's facility 110 are made available, the data is then restored from the remote backup servers 111 during a low demand period. Once the primary NSSS 101(1) is restored to full functionality, the primary NSSS is then set to synchronize its data with the backup NSSS 101(2) as before, and the backup NSSS 101(2) is set to synchronize at intervals with the backup server bank 111. NSSS access to the data at the server bank 111 is then disabled.

The firewall connection 114 on the backup NSSS 101(2) remains disabled under normal operations. In the event the firewall 108(1) on the primary NSSS 101(1) fails, the firewall connection 114 for firewall 108(2) on the backup NSSS 101 (2) is enabled and the configuration is restored to firewall 108(2) from the primary NSSS firewall 108(1). Firewall 108 (2) is then set to act as the gateway in place of the primary NSSS firewall 108(1).

In an exemplary embodiment, both NSSS devices 101(1)/(2) each have 5 network ports which are assignable to different tasks. In a normal configuration, the primary NSSS 101(1) has three ports enabled; one for the connection to the Internet through its own firewall 108(1), one for the LAN connection, and one for the direct connection to the backup unit 101(2). The backup NSSS 101(2) typically has 2 ports enabled; one for the LAN and one for the direct link 106 to the primary NSSS 101(1). The external firewall connection 108(2) is connected to the Internet, but is left disabled, and is only enabled in a fail-over scenario. In the present embodiment, all network ports for both NSSS devices are 10/100/1000 Ethernet network interfaces.

Figure 1C:
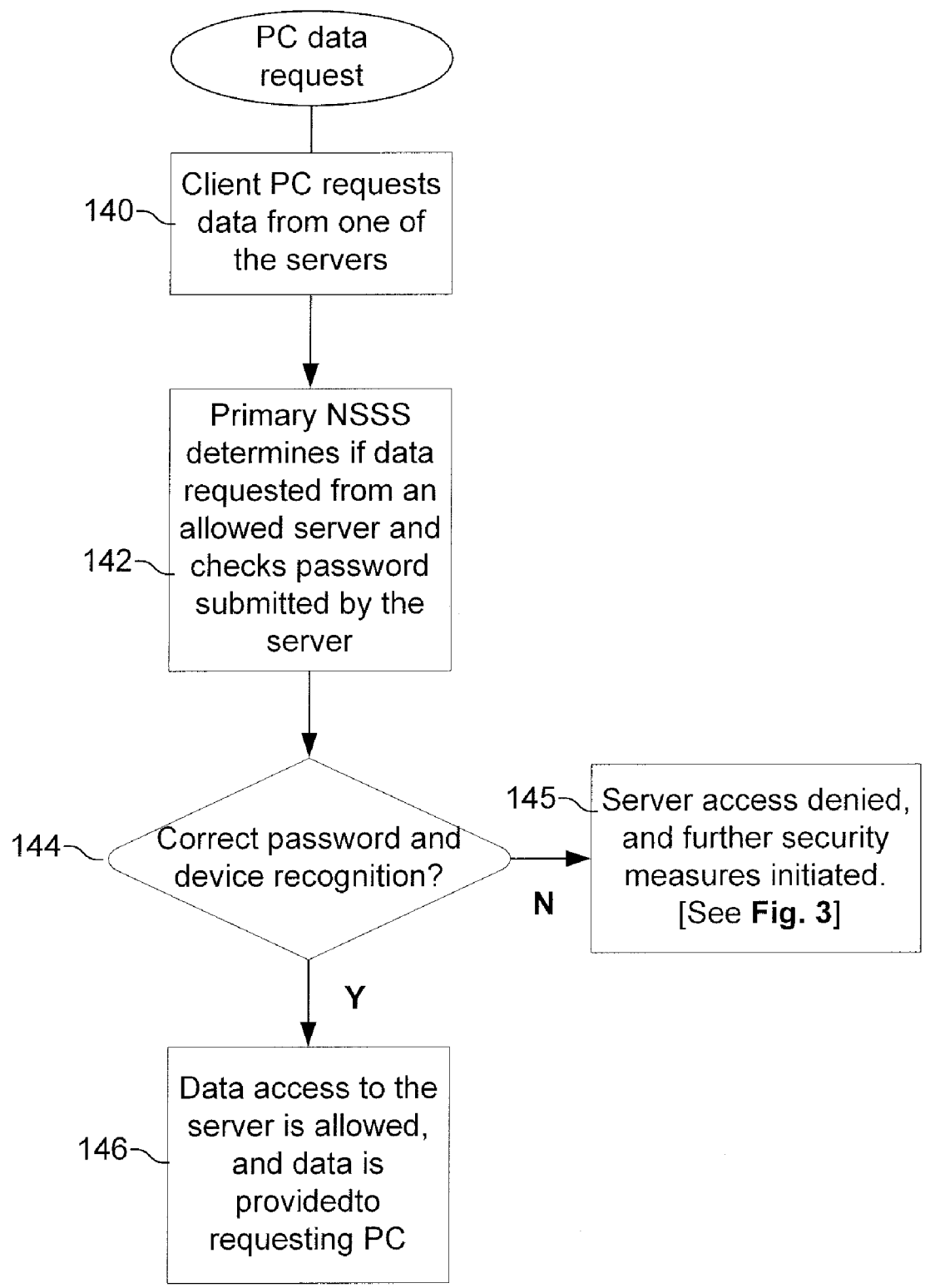
FIG. 1C is a flowchart showing an exemplary set of steps performed by the present system when a system PC requests data.

FIG. 1C is a flowchart showing an exemplary set of steps performed by the present system when a system device, such as a PC (personal computer) 105, requests data. When any device on the LAN attempts Internet access via its LAN connection, the primary NSSS 101(1) uses firewall 108(1) to grant specific Internet traffic access to the Internet, but does not allow access to the data contained in hard drives 103. The appropriate server 104(*) maintains a secure connection through the LAN with the primary NSSS.

As shown in FIG. 1C, at step 140, when a client PC 105 requests data from one of the servers 104(*), the primary NSSS 101(1) determines if the data request is directed to an allowed server and checks the password submitted by the server, at step 142. Servers 104 and LAN PCs 105 are authenticated by hardware identification and a user name/password that is configured in the primary NSSS 101(1). In an exemplary embodiment, users are required to change this password at regular intervals.

At step 144, if the correct password has been submitted and the requested server is authorized and available, then access to the server is allowed, and the server provides the data to the requesting PC (or other system device), at step 146. If the correct password has not been submitted, or an unauthorized or unavailable server is requested, then server access is denied, and further security measures are initiated, as described below in detail with respect to FIG. 3.

Figure 2:
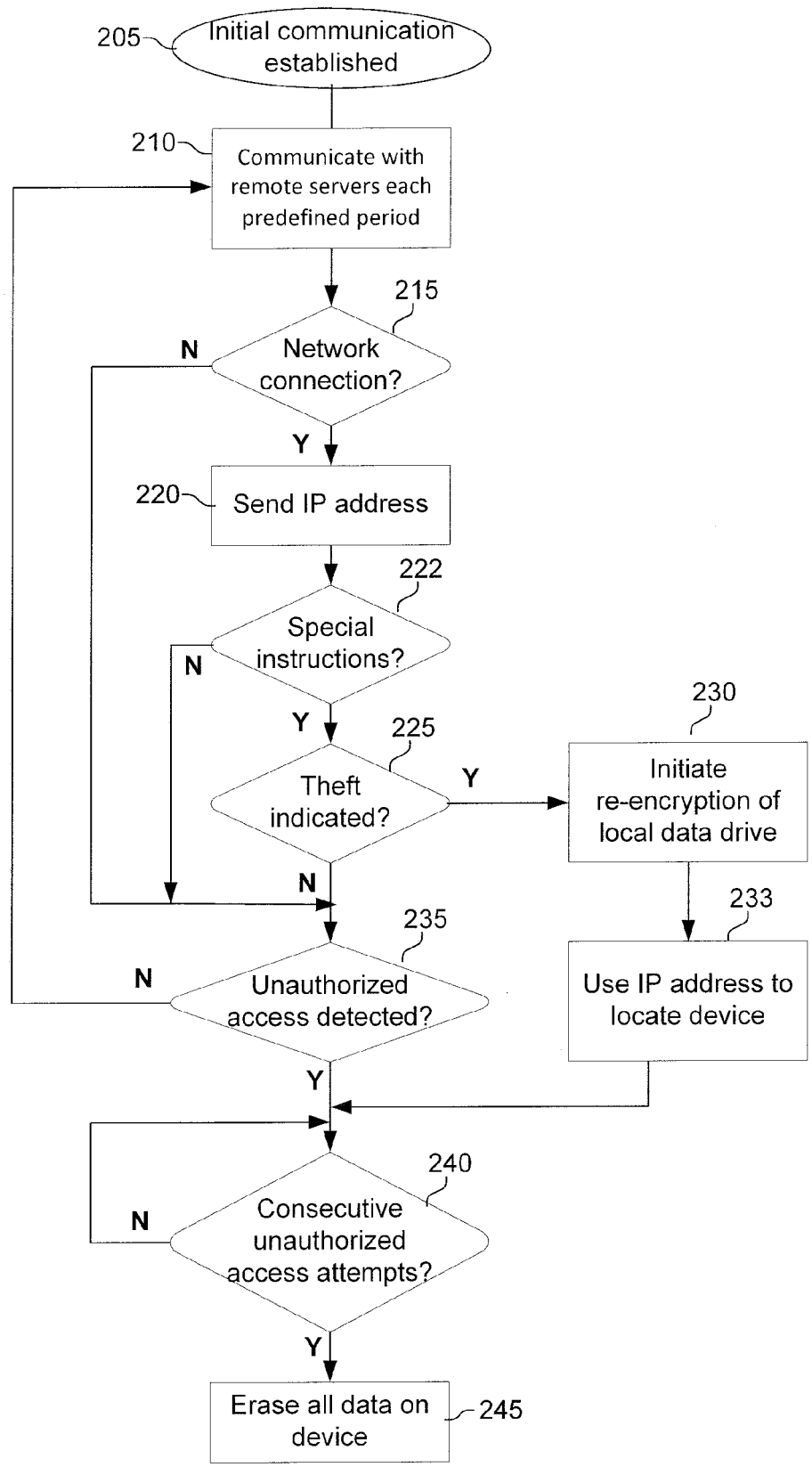
FIG. 2 is a flowchart showing an exemplary high-level set of steps performed by the present system.

FIG. 2 is a flowchart showing an exemplary high-level set of steps performed by the present system 100. As shown in FIG. 2 at step 205, in normal operation, initial communication is established between primary NSSS 101(1) and servers 104(*) or LAN PCs 105(*). Once a connection is established, the password that servers 104 or PCs 105 are using will allow data access as long as the network session to the NSSS 101(1) is maintained. If a server 104 or PC 105 loses its connection to the NSSS 101(1) at any time, the process starts again at step 205.

At step 210, each NSSS 101 attempts to communicate with report server 116 on a periodic basis (for example, each hour). If, at step 215, a network connection with the report server 116 is not presently established, then the present process proceeds at step 235, described below.

If a network connection is presently established, then at step 220, NSSS 101 sends its current IP (Internet Protocol) address to the report server 116. At step 222, NSSS 101 checks for a communication from report server 116 indicating special instructions that are pending. These special instructions are sent to deploy updates and upgrades, as well as to instruct an NSSS that its data should be encrypted or erased as a result of theft of the NSSS.

If there are special instructions at step 225 which indicate that theft of an NSSS 101 has been reported, then re-encryption of the data stored on the NSSS' hard drive 103 is initiated at step 230, and at step 233, the NSSS' IP address reported at step 220 can be used to determine the NSSS' present location. Once the data on drive 103 has been re-encrypted, the new key required to decrypt that data is stored in report server 116 and sent to the associated NSSS (as a special instruction) when it is determined that the NSSS has been recovered and is in the possession of the appropriate person.

If no special instructions are pending, then at step 235, NSSS 101 executes a series of steps to determine whether unauthorized access to the NSSS has been attempted, as further described below. If no unauthorized access has been detected, operation continues at step 210 and data access is still allowed. If, however, an attempt at unauthorized access has been detected 235, and a predetermined number of consecutive unauthorized access attempts are subsequently detected, then at step 240 all data, or a predetermined subset thereof (e.g., all data categorized or stored as proprietary data) on the NSSS 101 is erased, at step 245.

Each NSSS 101 implements whole-drive encryption between the physical layer and the file system layer. Hard drive 103 is encrypted, and the file system is created inside the encrypted volume. The operating system is not stored on the same drive as the user data, but in separate flash (or other nonvolatile) memory 153 in the NSSS 101. The password to initiate a hard drive mount (to make the data on drive 103 usable) is stored in an encrypted file on the system security key 107. The password is sent to each NSSS 101 via an encrypted connection between the NSSS 101 and the security key 107. The NSSS 101 periodically checks that the security key 107 is still connected, and if at any point a connection is not detected, the NSSS 101 dismounts the data drive(s) 103. A 'dismounted' drive is essentially disabled, that is, the data on a dismounted drive is rendered essentially unreadable by all devices, including the associated NSSS 101. Dismounting makes all user data, stored on data storage drives that are accessible to the NSSS, inaccessible.

Figure 4:
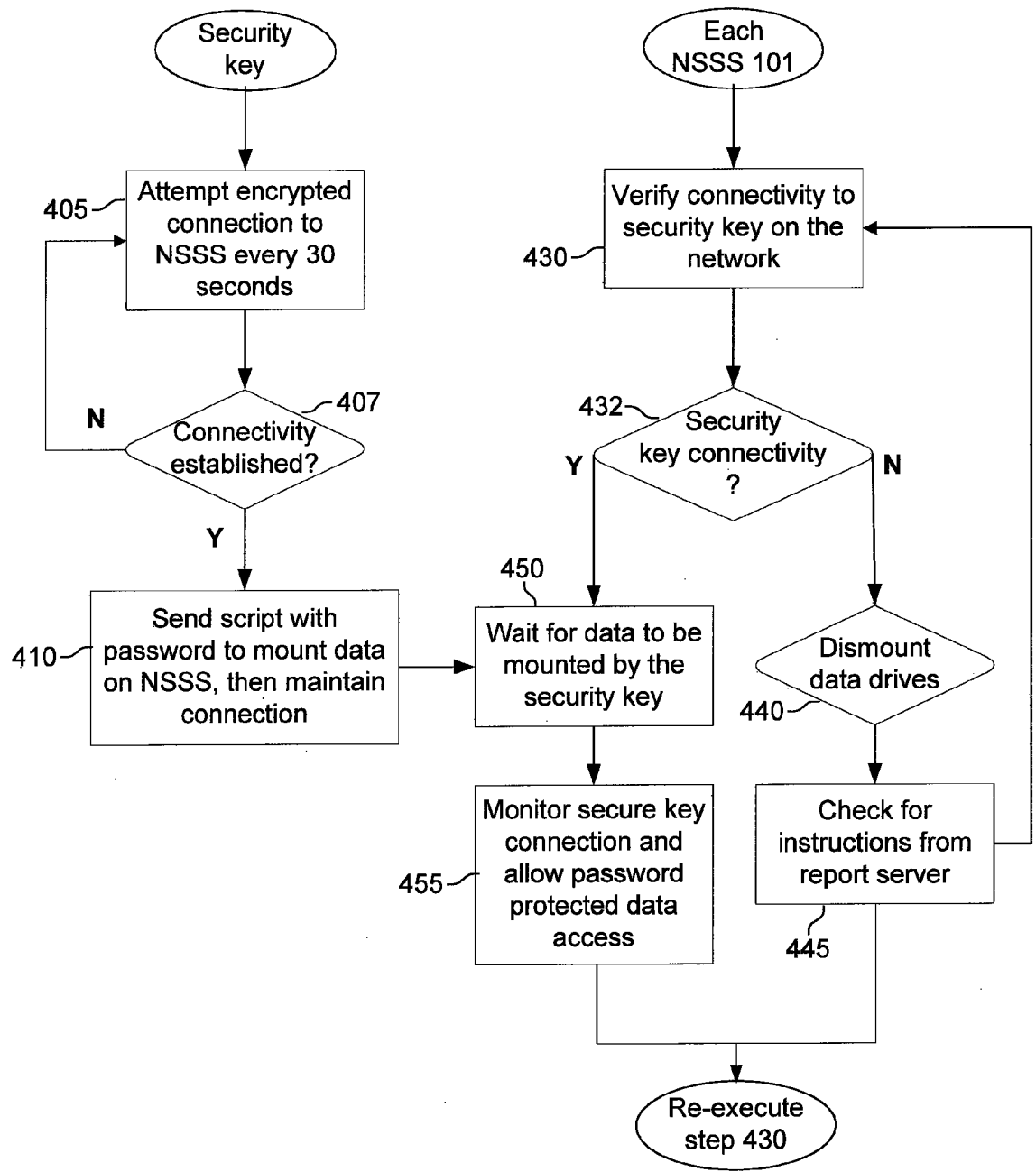
FIG. 4 is a flowchart showing an exemplary set of steps detailing operation of the system security key.

The above process is also executed in any scenario in which a remote NSSS 101(3) exists, except that an encrypted connection is maintained across the Internet between the remote NSSS 101(3) and the security key 107. In the event the Internet connection is lost (for longer than a predetermined interval) then, as indicated in FIG. 4, the remote NSSS will dismount its data and wait for the security key connection to re-establish, and then check for instructions from the report server 116.

Figure 3:
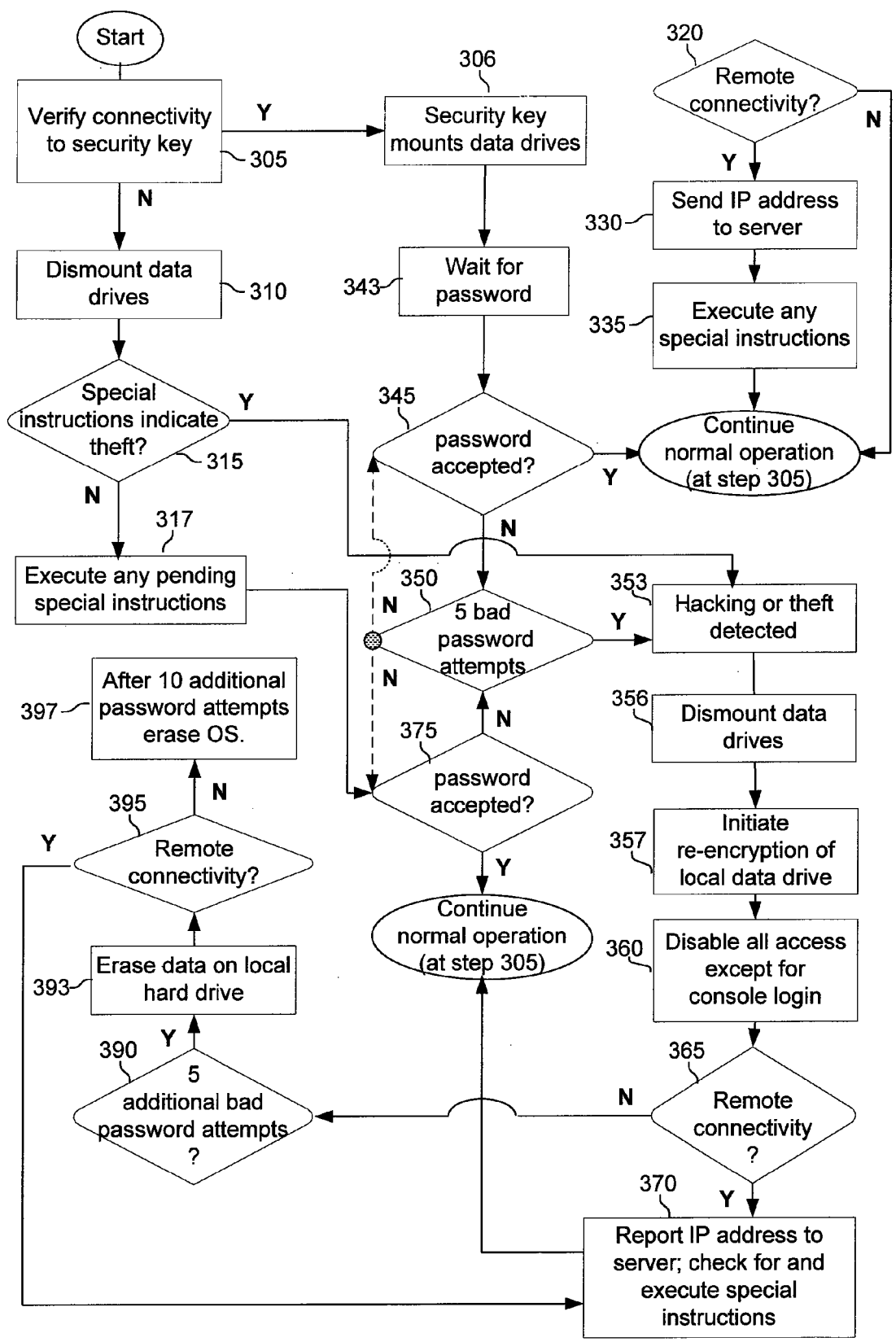
FIG. 3 is a flowchart showing an exemplary set of steps performed by the present system when unauthorized access has been detected.

FIG. 3 is a flowchart showing an exemplary set of steps performed by the present system 100 in determining (a) when unauthorized access has been detected, and (b) what operations are to be performed thereafter. As shown in FIG. 3, at step 305, an attempt to verify connectivity to the system security key 107 is initially made by NSSS 101 at predetermined intervals. If there is presently no security key connectivity, then the data drives 103 are dismounted, at step 310.

At step 315, NSSS 101 checks for pending special instructions from report server 116. If there are special instructions at step 315 which indicate theft of the NSSS 101 has been reported, then steps are initiated to prevent access to the NSSS' data on drive 103, starting with step 356, as described below.

If there are any special instructions pending at step 315 which indicate that other operations need to be performed by NSSS 101, such as downloading of NSSS updates or upgrades, then these instructions are executed at step 317. At step 375, if the NSSS has accepted a user's password, then the NSSS waits for a connection to the security key 107, at step 305. If the user's password has not been accepted, then at step 350, a check is made to determine whether a predetermined maximum number of invalid concurrent password attempts (e.g., 5 attempts) have been made. If the maximum number has not been reached, the NSSS loops between steps 375 and 350 until either a valid password is entered or the user has tried to enter an invalid password 5 times (in the present example).

If security key 107 connectivity has been established at step 305, then at step 306, the security key 107 mounts the data drives 103 and the NSSS waits for users to attempt access to one of the servers 104(*), a PC 105(*), or to the NSSS itself, via its console, using a password at step 343. If the password is accepted, at step 345, then the NSSS 101 continues normal operation at step 305, where it waits for security key connectivity on the network. If the user's password has not been accepted by the NSSS, then at step 350, a check is made to determine whether a predetermined maximum number of invalid password attempts (e.g., 5 attempts) have been made. If the maximum number has not been reached, the NSSS loops between steps 345 and 350 until either a valid password is entered or the user has tried to enter an invalid password 5 times (in the present example).

In the latter case (5 invalid password attempts), the NSSS 101 determines that 'hacking' into the NSSS 101 (or system 100) has been attempted (step 353), causing the NSSS to dismount the data drive at step 356 and initiate re-encryption of the data stored on the NSSS' hard drive 103, at step 357. Next, at step 360, all access to the present NSSS 101 is disabled, except for login via console/keyboard 180.

At step 365, NSSS 101 checks to see if connectivity to report server 116 is present. If not, then if a predetermined number of invalid password attempts are made (e.g., 5 attempts) at step 390, the data on the NSSS' hard drive 103 is erased, at step 393. At step 395, if connectivity to report server 116 is still not presently established, then if a predetermined additional number of invalid password attempts are made (e.g., 10 more attempts), the operating system on drive 153 is erased, at step 397.

At step 365 or 395, if connectivity to report server 116 is presently established, then at step 370 the IP address of the NSSS is reported to the report server 116 and the NSSS checks for and executes any pending special instructions, and normal operation is continued at step 305, unless the instructions indicate otherwise.

Step 320 executes at a pre-determined interval, wherein the NSSS 101 checks for Internet connectivity to report server 116. The NSSS, if connected, reports its current IP address and its security status to report server 116 at step 330. Security key connectivity indicates (and requires) that NSSS 101 is connected to the LAN, and establishing remote connectivity at step 320 requires that the Internet is available. At step 335, NSSS 101 checks for and executes any pending special instructions from report server 116, and normal operation is continued at step 305.

If connectivity to report server 116 has not been established at step 320, then normal operation continues at step 305, and another attempt to establish connectivity (at step 320) to report server 116 is made at the next interval.

Theft of a NSSS

Theft is determined by disconnection from the security key 107 on the network coupled with hacking attempts, or when a user reports theft. If an NSSS 101 is turned off, then when it is turned back on, it will again attempt to establish a connection with the security key and report server 116. An NSSS 101 can be traced to its approximate geographic location by its IP address, and specific location information can be obtained by the Internet service provider serving that IP address. If an NSSS 101 is connected to a network that has internet access after either of the above-noted theft trigger events, it will send its current IP address to report server 116.

There are two separate situations in which an NSSS 101 recognizes that theft has occurred:
   (a) a first situation wherein special instructions are received from the report server 116 indicating that theft has been reported by a user, and
   (b) a second situation wherein the NSSS itself determines that theft has likely occurred, as a result of failed password attempts.

In the first situation, upon discovery of theft of a NSSS 101, a procedure is initiated such that the report server 116 sends special instructions to the NSSS 101 to immediately dismount, re-encrypt and possibly also erase the data on the stolen NSSS. If the NSSS 101 is ever able to establish a connection to the report server again, it will retrieve and execute these instructions. If the NSSS 101 does not report to the report server 116 within a predetermined time period, a network disconnection is determined and pre-determined staff at sites 130 and 110 will be automatically notified by the report server 116.

In the second situation, when a predetermined number of consecutive unauthorized access attempts (e.g., 5 attempts) are made, the data on the entire NSSS 101 device is dismounted (at step 356 in FIG. 3), regardless of security key 107 connectivity, and all of the data on the entire NSSS 101 device is re-encrypted (at step 357). In this situation, in an exemplary embodiment, NSSS 101 re-encrypts the data on drive 103 to 4096 bit encryption and disables all access to data stored on the NSSS except for console (NSSS keyboard 180) login.

The procedures detailed above in can function in combination to provide a more immediate response to theft. In this particular embodiment, as soon as theft of an NSSS is reported, special instructions are placed on the report server 116. When the NSSS 101 is powered up, (provided the NSSS is connected to the Internet) it retrieves special instructions that will dismount the data drive 103 and initiate re-encryption. The NSSS 101 can receive instructions to initiate, or initiate by its own process, both a data drive dismount activation and a 'secure erase' function to obliterate all data on the device.

In any scenario, regardless whether instructions are received from the report server 116 or determined by an NSSS' own process, the most extreme one of the possible responses is executed. For example, if hacking is attempted and the NSSS is in the state represented by step 365 (in FIG. 3) where no remote connectivity has been established, the next step indicated is to wait for 5 more bad password attempts. However, if connection to the report server occurs at this point and instructions are received which indicate that local data and the operating system are to be erased, then step 390, which would normally follow, is not executed in this case. Instead, the NSSS immediately erases everything as instructed.

If a report server 116 is able to connect to an NSSS 101 and the NSSS reports its status as stolen, monitoring of the device is continued, and an attempt is made to locate the device by tracing the device IP address. It is optional at this point (depending on the determined location of the NSSS and its status as determined by manual means) whether or not to erase data on the OS drive 153. After a predetermined number of further hacking attempts, the NSSS will erase its local data, although this operation can be postponed if the device is located and recovered. In one possible situation, the NSSS' data is erased, but the operating system on drive 153 remains intact.

Security Key

System security key 107 is a network-attached device that initiates a hard drive mount on an NSSS 101. The encrypted drive system (on drives 103) is not accessible without the security key providing the NSSS 101 authorization to operate. Thus an NSSS 101 relies upon the security key 107 to enable its operation. An NSSS 101 cannot function normally without the security key being functional.

Traditionally, a security dongle is used to prevent unauthorized use of software. With this approach, a particular piece of hardware, usually a USB key that contains some type of encrypted pass code, is required to allow a user to open and use a particular application. Without the key, the software will not work. In an exemplary embodiment, the device used in the present system to implement the security key 107 is a Pico-Tux PC, with power-over-Ethernet. The essential difference between the traditional approach and the secure key is that the secure key uses a 'nano-PC' located on the LAN network instead of a 'dongle' attached directly to the computer. This extremely small PC can be hidden anywhere in a user's building and is operative with only an Ethernet cable connected to it (or for further hiding can be connected via a wireless bridge allowing for there being no wires to trace its location). In normal operation, the security key and each NSSS 101 at a user site maintains an encrypted connection. If the two entities are separated for any reason, the NSSS' hard drive 103 will not 'mount', or if already mounted, will dismount, and thus the data thereon will not be accessible. If the NSSS 101 is not connected to the security key 107, the NSSS executes the sequence of steps beginning at step 310 in FIG. 3.

FIG. 4 is a flowchart showing an exemplary set of steps detailing operation of the system security key 107. An NSSS 101 exemplifies any type of computer that requires secure access to a program or hardware device (in this case, hard drive 103). The security key 107 is not limited to a single computer as is a normal 'dongle' type key. The security key can manage access to multiple computers on the LAN, or across an Internet connection.

As shown in FIG. 4 at step 405, every 30 seconds (or at whatever interval is suitable for a given application) security key 107 attempts to establish an encrypted connection to each NSSS 101 in system 100. If a connection is not established, the security key continues connection attempts until a connection is established, executing a loop between steps 407 and 405. Once a connection is established, the security key 107 sends a password and instructions to mount data drive 103. In the case of a software application, security key 107 sends a password that allows the application to be loaded on the NSSS, at step 410. The connection is then maintained during normal operation. If the connection is broken, then the security key 107 begins the process again at step 405.

Each NSSS 101 verifies its connection to security key 107 at predetermined intervals, as indicated by step 430. If no connection is detected (at step 432), data drives 103 are dismounted at step 440 (this process is detailed further at step 310 in FIG. 3) and the NSSS awaits further instructions at step 445 (the equivalent step as step 315 in FIG. 3) and continues to attempt to establish the connection with the security key 107, back at step 430. In the case of a software application, the application will remain usable as long as it is running, but will not open again, if closed, until the connection with the security key is re-established. Once security key connection is established at step 450, data drives 103 are mounted, and data access is allowed and monitored via the use of a password at step 455. If the security key connection is dropped, the NSSS 101 loops back to step 430. Step 455 is detailed further in FIG. 3, beginning at step 345.

Exemplary Failure Scenarios

Hard Drive Failure in Either NSSS

In the event a hard drive 103 fails in either NSSS 101, the NSSS can be taken offline and a new drive 103 installed. The RAID mirror is then rebuilt, returning the system 100 to a fully functional state. For systems with large storage capacity or no down-time requirements, a RAID controller with hot swap functionality is used, allowing for replacement of a failed drive without interruption of data availability to the NSSS 101.

Backup NSSS Fails

A replacement NSSS 101(2) is configured and user data is copied from the remote backup server 111 to the replacement NSSS 101(2). The primary NSSS 101(1) then updates the backup NSSS 101(2) and service continues.

Primary NSSS Fails

The WAN cable (line 113) is unplugged from the primary NSSS 101(1) and then the disabled WAN/firewall port 171 on the backup NSSS 101(2) is enabled. The backup NSSS 101(2) is then instructed to restore the configuration from the primary NSSS to itself and restart, thus enabling it to function as the new primary NSSS 101(1). Then the same process is followed to replace the now missing backup NSSS 101(2) as if the backup NSSS 101(2) had failed.

Fire, Flood or Other Catastrophic Event

In the event that both NSSSs 101 are destroyed, a limited amount of user data (stored on the remote backup server 111) may be made available via a secure Internet connection. Once the central user facility 110 is restored, new NSSSs 101(1) and 101(2) are loaded with user data which was backed up at remote server site 130 and put in place at the user facility 110.

Theft

A. A Hard Drive is Stolen from a NSSS

Drive 103 is replaced. Since the hard drive is part of an AES encrypted array, user data is relatively safe from discovery.

B. An Entire NSSS is Stolen

In an exemplary embodiment, the purloined NSSS 101, when powered up, checks to see if it is connected to the security key 107 and checks for access to the report server 116 and proceeds as described in FIG. 3. In the event an NSSS is stolen and cannot connect to either the security key 107 or the report server 116 for more than 5 days and the NSSS detects no attempts at hacking, the NSSS will automatically re-encrypt the hard drive to 4096 bit encryption. If after 20 days it still cannot connect to either the report server 116 or secure key 107, it will erase all the local data 103 and its OS drive 153. A single decryption key 117 which allows decryption of data on the local hard drive is located on the remote backup server bank 111. Key 117 is periodically changed randomly by the report server and updated on the NSSS at regular intervals.

In any instance in which a thief connects the stolen NSSS to the Internet before the 20 day time limit, the purloined NSSS 101 will report its current IP address and status to the report server 116 and check for instructions from the report server 116.

A worst-case scenario is where a NSSS is stolen, never powered on, and the data drives 103 removed and an attempt is made to recover data on the encrypted drive. There are several reasons as to why it is difficult, if not practicably impossible to recover data in this scenario. First of all, the attacker would have to rebuild the specific type of RAID; however, it is very difficult to determine the exact RAID configuration without starting up the NSSS with the hard drives 103 connected first. Then the attacker would have to crack the 256 bit encryption scheme with which the data on the NSSS' hard drive is encrypted. In all likelihood, (as it is easier to access a system already put together) an attacker would not remove the drives in the first place, which will allow the NSSS 101 to erase all local data soon after the start of an attack, regardless of the NSSS' connection status.

Certain changes may be made in the above methods and systems without departing from the scope of that which is described herein. It is to be noted that all matter contained in the above description or shown in the accompanying drawings is to be interpreted as illustrative and not in a limiting sense. For example, the methods shown in FIGS. 1C and 2-4 may include steps other than those shown therein, and the system shown in FIGS. 1A and 1B may include different components than those shown in the drawings. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall there between.

What is claimed is:

1. A method for the secure storage of information in a network comprising:
   encrypting data stored on a primary server connected to the network;
   sending the IP address of the primary server to a second server, via the network; and
   receiving a communication from the second server indicating pending instructions;
   if the instructions indicate that theft of the primary server has occurred, then
   re-encrypting the data stored on the primary server and sending the IP address of the primary server to the second server; and
   if attempted unauthorized access of the primary server is determined by the primary server, and a predetermined number of consecutive unauthorized attempts to access the primary server are made, then
   initiating, by the primary server, erasing of the data stored on the primary server.

2. The method of claim 1, wherein unauthorized access of the primary server is determined by:
   receiving a password entered via the primary server;
   repeating the step of receiving a password, if the password is not accepted; and
   receiving a predetermined number of passwords that are not accepted.

3. The method of claim 2, wherein:
   if the predetermined number of passwords are received but not accepted, then disabling access, via the primary server, to the data stored on the primary server and re-encrypting the data stored thereon;
   if a predetermined number of additional passwords are received but not accepted, then erasing the data stored on the primary server.

4. The method of claim 1, wherein the IP address of the primary server sent to the second server is used to determine a physical location of the primary server.

5. The method of claim 1, wherein the primary server includes an operating system, and wherein the operating system is erased if a predetermined additional number of passwords are received but not accepted after erasing the data stored on the primary server.

6. A system for secure storage of data in a network comprising:
   a computer coupled to the network and to at least one data storage device;
   a server, located off of the premises on which the computer is situated, and coupled to the network;
   a security key device coupled to the network; and
   a second computer coupled to the computer via the network;
   wherein:
   data stored on the storage device is encrypted; and
   if no connectivity is established between the computer and the security key device, then the storage device is disabled;
   if connectivity is established, then access to the storage device is enabled; and
   the computer checks for a communication from the second computer indicating pending special instructions; wherein
   if special instructions received in the communication indicate that theft of the computer has occurred, then the data stored on the storage device is re-encrypted;
   if no special instructions are received in the communication, then if a predetermined number of consecutive unauthorized attempts to access the computer are made, then the data stored on the storage device is erased.

7. The system of claim 6, further including:
   receiving a password from a PC connected to the server; and
   repeating the receiving step if the password is not accepted;
   if a predetermined number of passwords are received but not accepted, then disabling each said data storage device and re-encrypting the data stored thereon; and
   if a predetermined number of additional passwords are received but not accepted, then erasing the data stored on each said data storage device.

8. The system of claim 6, wherein, the computer is prevented from accessing the data stored on the storage device when the storage device is disabled.

9. The system of claim 6, wherein the password is entered via the computer.

10. The system of claim 6, wherein:
    the IP address of the computer is sent to the server; and
    the IP address is used by the server to determine a physical location of the computer.

* * * * *